United States Patent
Back et al.

(10) Patent No.: US 7,036,643 B2
(45) Date of Patent: May 2, 2006

(54) METHOD OF OPERATING HYDROKINETIC TORQUE CONVERTERS IN THE POWER TRAINS OF MOTOR VEHICLES AND TORQUE CONVERTER FOR THE PRACTICE OF THE METHOD

(75) Inventors: Gunnar Back, Buhl (DE); Rudolf Honemann, Ottersweier (DE); Stephan Maienschein, Baden-Baden (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 47 days.

(21) Appl. No.: 10/706,297

(22) Filed: Nov. 11, 2003

(65) Prior Publication Data

US 2004/0144607 A1    Jul. 29, 2004

(30) Foreign Application Priority Data

Nov. 16, 2002   (DE) ............................... 102 53 475

(51) Int. Cl.
*F16H 45/02* (2006.01)

(52) U.S. Cl. ................................. 192/3.3; 192/113.36
(58) Field of Classification Search ............... 192/3.28, 192/3.29, 3.3, 3.31, 3.33, 113.31, 113.34, 192/113.35, 113.36

See application file for complete search history.

(56) References Cited

U.S. PATENT DOCUMENTS

| 5,377,746 | A   | 1/1995  | Reld et al. |
| 5,725,447 | A   | 3/1998  | Friedmann et al. |
| 5,782,327 | A   | 7/1998  | Otto et al. |
| 5,964,329 | A * | 10/1999 | Kawaguchi et al. .......... 192/3.3 |
| 6,047,806 | A * | 4/2000  | Sasse .................... 192/113.36 |
| 6,640,946 | B1* | 11/2003 | Bauer et al. ................ 192/3.29 |
| 6,832,673 | B1* | 12/2004 | Baumann et al. .......... 192/3.29 |

OTHER PUBLICATIONS

U.S. Appl. No. 10/704,264, filed Nov. 6, 2003, Maienschein.

* cited by examiner

*Primary Examiner*—Saul Rodriguez
(74) *Attorney, Agent, or Firm*—Darby & Darby

(57) ABSTRACT

The hydrokinetic torque converter between the prime mover and the transmission in the power train of a motor vehicle is designed to promote and/or otherwise regulate the flow of hydraulic fluid therethrough. The fluid is circulated between the friction linings on the laminations of the bypass clutch in the housing of the torque converter. In a first embodiment of the method, the flow of fluid in certain parts of the torque converter is opposed or interfered with in such a way that a larger quantity of fluid flows between the laminations of the bypass clutch. In a second embodiment, the resistance to fluid flow through the bypass clutch of the torque converter is reduced. It is also possible to resort to both solutions in one and the same torque converter.

17 Claims, 6 Drawing Sheets

METHOD OF OPERATING HYDROKINETIC TORQUE CONVERTERS IN THE POWER TRAINS OF MOTOR VEHICLES AND TORQUE CONVERTER FOR THE PRACTICE OF THE METHOD

BACKGROUND OF THE INVENTION

The invention relates to improvements in hydrokinetic torque converters, especially for use in the power trains of motor vehicles, and to improvements in methods of operating such torque converters.

A hydrokinetic torque converter which is utilized in the power train of a motor vehicle forms part of an operative connection between the prime mover (such as an internal combustion engine or a hybrid drive) and the change-speed transmission. Reference may be had, for example, to commonly owned U.S. Pat. No. 5,782,327 granted Jul. 21, 1998 to Otto et al. for "HYDROKINETIC TORQUE CONVERTER AND LOCKUP CLUTCH THEREFOR", as well as to the publications which are discussed in the specification of this patent. The efficiency of the torque converter can be enhanced by resorting to a so-called bypass or lockup clutch which, as a rule, becomes engaged when the ratio of the RPM of the turbine to the RPM of the pump in the housing of the torque converter is between about 0.8 and 0.85. The efficiency of the torque converter rises to or approximates 100% as soon as the bypass clutch is engaged. Proper operation of the torque converter is ensured if its housing is at least substantially filled with a suitable hydraulic fluid (such as oil) at all times. Furthermore, and since the hydraulic fluid is likely to be heated and contaminated, it is desirable to ensure continuous circulation and simultaneous cooling and/or cleaning of such fluid.

Certain torque converters are designed in such a way that the fluid stream serves to operate and lubricate the bypass clutch. The arrangement can be such that the stream of fluid which issues between the turbine and the pump of the torque converter bears upon an axially movable disc which forms part of the bypass clutch, which is concentric with the turbine and which is provided with a friction lining. When the pressure of the fluid stream increases, the disc is caused to urge its friction lining against the adjacent portion of the internal surface of the rotating torque converter housing, i.e., the bypass clutch is engaged and transmits torque from the housing (which is driven by the rotary output element of the prime mover) to the rotary input element (e.g., a shaft) of the change-speed transmission. The bypass clutch can become disengaged when the pressure of the fluid stream decreases or when the direction of fluid flow is reversed, depending upon the design of the torque converter and of its bypass clutch.

It is also known to design a torque converter for use in the power train of a motor vehicle in such a way that its bypass clutch is engaged in response to admission of hydraulic fluid into a so-called third channel or passage. If the pressure of fluid in the third channel decreases, the circulating fluid stream (which is supplied by a first and a second channel) disengages the bypass clutch. A torque converter which is provided with a third channel normally employs a bypass clutch having a package of several laminations or discs with friction linings thereon, i.e., the engagement of such bypass clutch involves the transmission of torque by the entire package of such laminations.

In order to avoid or reduce fluctuations of torque in the power train of a motor vehicle, the torque converter in the power train can be operated in such a way that it becomes disengaged in a certain manner when subjected to load. Thus, the bypass clutch is caused to generate (at least in a certain portion of the power train) oscillations which oppose normal fluctuations of torque in the power train, i.e., the normal fluctuations of torque become less pronounced with attendant reduction of their adverse influence upon the power train.

That stage of operation of a clutch when the surfaces of linings, laminations and analogous torque transmitting parts are in sliding contact with each other and/or with the friction generating parts is known as operation with slip. Such mode of operation invariably entails the generation of heat irrespective of the nature of the substances (such as metal, special friction lining material or the like) of which the laminations are made or which are utilized as coatings for metallic or other laminations. The thus heated discs exchange heat with the hydraulic fluid in the housing of the torque converter. Overheating of the discs entails damage thereto, especially if the discs are not lubricated in a required manner. Furthermore, overheating can result in at least partial decomposition of the hydraulic fluid. The thus decomposed hydraulic fluid and/or broken-off particles of metallic laminations, friction linings and torque converter housing can affect the operation and hence the reliability of the torque converter and/or its bypass clutch and/or of the power train.

OBJECTS OF THE INVENTION

An object of the present invention is to provide a novel and improved torque converter, particularly a hydrokinetic torque converter for use in the power train of a motor vehicle.

Another object of this invention is to provide a novel and improved bypass clutch or lockup clutch for use in the hydrokinetic torque converter.

A further object of the instant invention is to provide novel and improved methods of operating a hydrokinetic torque converter, particularly in the power train of a motor vehicle.

An additional object of the invention is to provide a power train which employs the improved torque converter.

Still another object of this invention is to provide a novel and improved method of guiding one or more hydraulic fluid streams in the housing of a torque converter.

A further object of the invention is to improve te lubrication of mobile parts in the bypass clutch of a hydrokinetic torque converter in the power train of a motor vehicle.

Another object of the invention is to provide a novel and improved mode of regulating the flow of hydraulic fluid into and through the bypass clutch in the housing of a hydrokinetic torque converter.

An additional object of the invention is to provide a novel and improved combination of a bypass clutch and a damper for the turbine in the housing of a hydrokinetic torque converter.

SUMMARY OF THE INVENTION

One feature of the present invention resides in the provision of a method of metering the flow of hydraulic fluid (such as oil and hereinafter referred to as oil for short) along at least one friction surface of at least one lamination of a package of neighboring laminations in an engageable and disengageable bypass clutch or lockup clutch forming part of a hydrokinetic torque converter wherein a housing confines a pump, a stator and a turbine in addition to the bypass clutch. The improved method comprises at least one of a plurality of undertakings including (a) a first undertaking comprising the steps of supplying oil into the housing and interfering with the flow of oil between the turbine and an inner side of the housing to thus increase the rate of oil flow along the at least one lamination, and (b) a second undertaking including the step of reducing resistance to the flow of oil through the bypass clutch to thus increase the rate of oil flow along the at least one friction surface of the at least one lamination.

The method can further comprise the steps of hydrostatically engaging and disengaging the bypass clutch including subjecting the bypass clutch to the action of a hydrostatic oil stream.

The aforesaid step of supplying oil can include conveying an oil stream along a first path extending through the pump, turbine and stator of the torque converter, and thereafter along a second path between the internal surface of the housing and an external surface of a shell forming part of the turbine.

Alternatively, the step of supplying oil can include conveying an oil stream along a first path extending between the internal surface of the housing and the external surface of the shell of the turbine, and thereafter along a second path extending through the pump, turbine and stator of the torque converter.

If the method further comprises the step of hydrostatically engaging and disengaging the bypass clutch, the resistance reducing step can include establishing a path for the flow of oil between a biasing member and an adjacent lamination in the disengaged condition of the bypass clutch.

The method can further comprise the step of regulating at least one of a plurality of parameters of the oil; such parameters can include the pressure and the temperature of oil.

The resistance reducing step of the second undertaking can include reducing the pressure of oil by between about 0.1 and 3 bar, preferably between about 0.2 and 1 bar.

The oil supplying step of the first undertaking can include conveying in the housing of the torque converter oil at a rate of between about 0.1 liter and 10 liters per minute, preferably between about 0.2 and 1 liter per minute.

The step of hydrostatically engaging and disengaging the bypass clutch can include conveying through the bypass clutch a discrete oil stream at a pressure such that the bypass clutch is operated with slip. The discrete oil stream can constitute a pulsating stream, and the operation with slip can include minimizing torsional vibrations in a power train (such as the power train of a motor vehicle) which embodies the torque converter.

At least one of the aforementioned undertakings can include the step of cooling the bypass clutch, transmitting torque from a prime mover to an automatic transmission in the power train of a motor vehicle, or transmitting torque from a prime mover to a continuously variable transmission (CVT) in the power train of the motor vehicle.

Another feature of the present invention resides in the provision of a hydrokinetic torque converter which comprises a torque-transmitting housing that is rotatable about a predetermined axis, a rotary turbine in the housing, and a bypass clutch or lockup clutch which is disposed in the housing and is engageable to transmit torque from the housing to an output member of the turbine. The housing and the turbine define a first path for the flow of oil to the bypass clutch and at least one second path, and the torque converter further comprises means for opposing the flow of oil along the second path.

The first path is or can be defined, at least in part, by at least one first channel and the second path can be defined, at least in part, by at least one second channel.

The torque converter can further comprise a turbine damper which is disposed in the first path.

The flow opposing means can include a plurality of closely adjacent neighboring substantially disc-shaped elements in the second path. Such torque converter can also comprise means for connecting the substantially disc-shaped elements to each other, and such connecting means can comprise at least one rivet having a head which is at least partially recessed into one of the disc-shaped elements. Alternatively, such connecting means can comprise at least one welded seam which is at least partially recessed into one of the disc-shaped elements.

At least one of the disc-shaped elements can constitute a stamping having at least one projection which extends away from a neighboring substantially disc-shaped element of the aforementioned plurality of such elements. The at least one projection can constitute a burr or a bent portion of the at least one substantially disc-shaped element.

Alternatively, at least one of the substantially disc-shaped elements can constitute a cutting having at least one projection which extends away from a neighboring substantially disc-shaped element.

That surface of at least one substantially disc-shaped element which confronts a neighboring substantially disc-shaped element can be provided with a secondary finish, e.g., in a grinding, turning or analogous machine.

At least two of the substantially disc-shaped elements can be spaced apart from each other by a clearance having a width of between 0.1 and 2 mm (as seen in the axial direction of the torque converter) and a length (as seen radially of the axis of the torque converter) of between 1 and 30 mm. In a presently preferred embodiment, the width is between 0.5 and 1 mm, and the length is between 1 and 10 mm.

The bypass clutch of the improved torque converter can comprise a plurality of laminations, and at least one of the aforementioned substantially disc-shaped elements can form part of one of the laminations.

If the torque converter comprises a turbine damper which is provided in the housing an includes at least one input element, one of the substantially disc-shaped elements can form part of the at least one input element.

If the turbine damper comprises a flange, at least one of the substantially disc-shaped elements can form part of such flange.

Still further, one of the substantially disc-shaped elements can form part of a hub of the turbine in the housing of the improved torque converter.

It is also possible to construct and assemble the improved hydrokinetic torque converter in such a way that its flow opposing means comprises at least one sealing ring, at least one diaphragm spring and/or at least one diaphragm or membrane.

If the bypass clutch of the improved torque converter comprises a package of neighboring laminations, a first carrier for a first set of such package of laminations, and a second carrier arranged to support a second set of the package of laminations and being disposed between the first carrier and the axis of the torque converter, the at least one diaphragm or membrane can be supported by the second carrier in such a way that it engages a safety ring on the first carrier. Alternatively, the diaphragm or membrane can be borne by the second carrier in such a way that it abuts a pressure plate or one of the laminations.

If the torque converter comprises a damper for the turbine, the aforementioned diaphragm or membrane can be riveted to an input element of the damper or to one lamination carrier of the bypass clutch.

The means for opposing the flow of oil along the second path can include an annular member which contacts a lamination carrier of the bypass clutch; such annular member can be recessed into the lamination carrier.

Alternatively, the flow opposing means can be arranged to operate between an input element and a flange of the turbine damper and can include a sealing ring or a diaphragm spring.

Still further, the flow opposing means can include a diaphragm spring or a sealing ring which operates between a flange of the turbine damper and a hub of the turbine. The hub can constitute a support for the sealing ring or the diaphragm spring.

At least one of the laminations between radially inner and outer supports of the bypass clutch can be provided with at least one axial inlet opening for the inflow of oil. For example, the at least one lamination can be provided with a toothed marginal portion which is adjacent one of the lamination carriers and defines with the one lamination carrier a plurality of passages for the flow of oil therethrough.

A further feature of the present invention resides in the provision of a power train which can be utilized with advantage in a motor vehicle and comprises a prime mover (such as an internal combustion engine), a transmission (such as an automatic transmission or a CVT transmission), and a hydrokinetic torque converter between the prime mover and the transmission. The torque converter comprises a torque-transmitting housing which is rotatable about a predetermined axis, a rotary turbine in the housing, a bypass clutch disposed in the housing and being engageable to transmit torque from the housing to an output member of the turbine, and means for opposing the flow of oil along a predetermined path. This path is defined by the housing and the turbine, and these parts further define a path for the flow of oil to the bypass clutch.

The novel features which are considered as characteristic of the invention are set forth in particular in the appended claims. The improved torque converter itself, however, both as to its construction and the modes of assembling and operating the same, together with numerous additional important features and attributes thereof, will be best understood upon perusal of the following detailed description of certain presently preferred specific embodiments with reference to the accompanying drawing.

BRIEF DESCRIPTION OF THE DRAWING

FIG. 5b is a similar enlarged fragmentary view of another detail in the bypass clutch embodying the structure of FIG. 5a;

DESCRIPTION OF PREFERRED EMBODIMENTS

Figure 1:
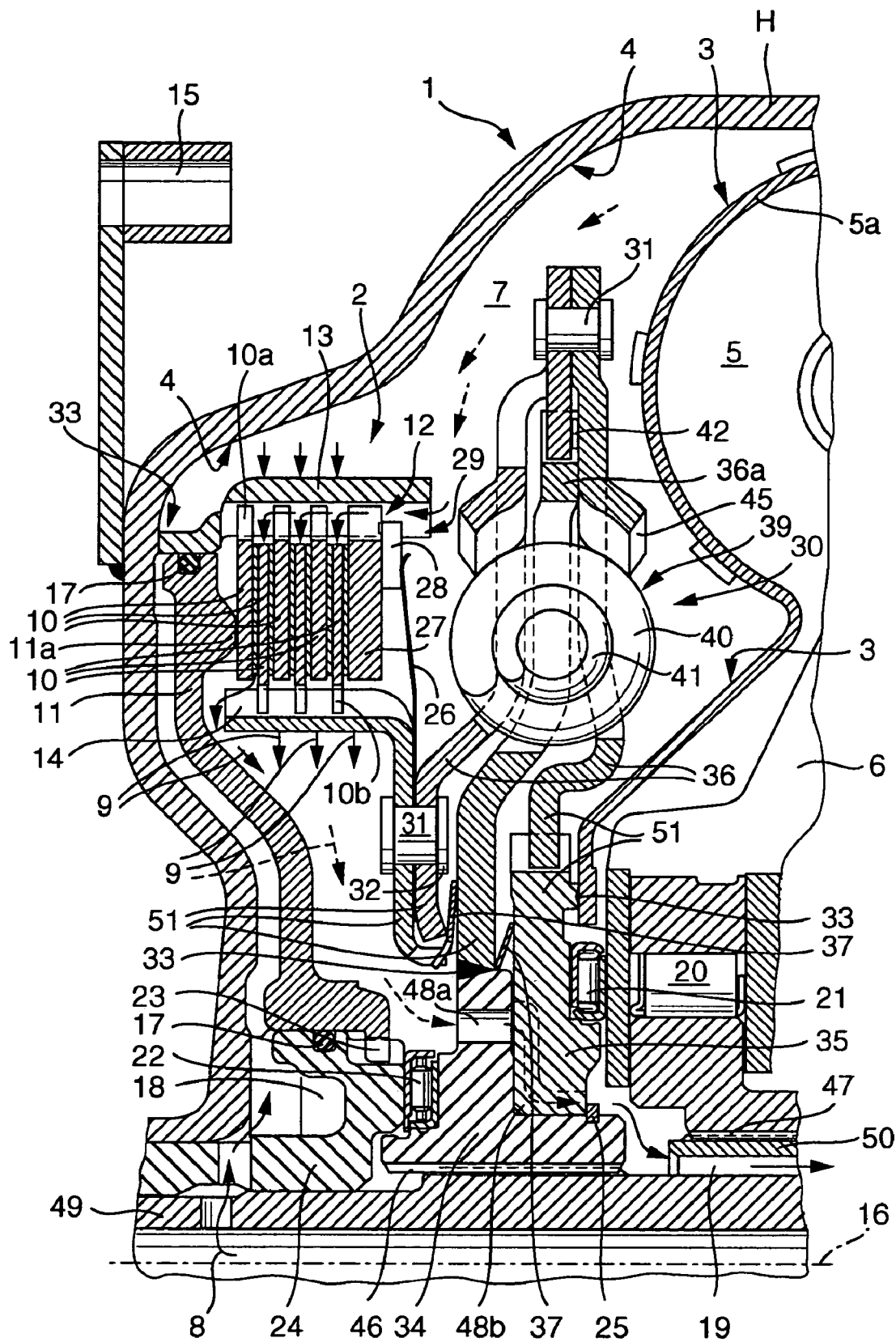
FIG. 1 is a fragmentary axial sectional view of a hydrokinetic torque converter which embodies one form of the invention and can be utilized with advantage in the power train of a motor vehicle, the bypass clutch of the torque converter being shown in an at least partially engaged condition.

FIG. 1 illustrates certain details of a hydrokinetic torque converter 1 which is assumed to be installed in the power train of a motor vehicle, namely between the output member (such as a crankshaft or a camshaft) of a non-illustrated prime mover (e.g., an internal combustion engine or a hybrid drive) and the input shaft 49 of a change-speed transmission, not shown. The housing H of the torque converter 1 is rotatable about an axis 16 which coincides with the axis of the input shaft 49. The means for rotating the housing H includes at least one connector 15 which is rotatable with the output member of the prime mover. It will be seen that FIG. 1 is not a true engineering drawing because it shows only those portions of various component parts which are located in the plane including the axis 16; such illustration is believed to be optimally suited to properly depict the relevant component parts of the improved torque converter 1.

The connector 15 can be secured to a flywheel (not shown) which is affixed to the rotary output member of the prime mover. The housing H contains a pump (not shown), a turbine 5 which is coaxial with and is adjacent the pump, and a stator or guide wheel 6 which is coaxial with and is disposed between the turbine 5 and the pump. An internal gear 47 of the stator 6 is non-rotatably mounted on a hollow shaft 50 which surrounds the input shaft 49. The latter performs or can perform the dual function of carrying the turbine 5 and of constituting the rotary input member of the transmission.

In order to enhance the efficiency of the torque converter 1 when the difference between the RPM of the pump and the RPM of the turbine 5 is small, the stator 6 is provided with a freewheel 20 which is effective in the direction of rotation of the pump. The turbine 5 comprises a hub-shaped or hub-like support 35; this part cannot be simply called a hub because it is not directly mounted on a shaft. Thus, in FIG. 1, the support 35 is mounted on a flange 34 of a turbine damper 30 which is non-rotatably mounted on the turbine shaft 49 by way of an internal gear 46.

The pump of the torque converter 1 is non-rotatably mounted in the housing H. Needle bearings 21 and 22 are provided to reduce friction which develops when the pump, the stator 6, the hub-shaped support 35, the flange 34 of the turbine damper 30 and a guide member 24 for an axially movable biasing member 11 are caused to turn relative to each other about their common axis 16. Such needle bearings, or suitable functional equivalents thereof, are often called upon to turn relative to each other while being subjected to very pronounced axial stresses. The manner in which a pump cooperates with a turbine in the housing of a hydrokinetic torque converter is disclosed in numerous US patents owned by the assignee of the present application.

Reference may be had, for example, to U.S. Pat. No. 5,377,746 granted Jan. 3, 1995 to Friedmann et al. for "APPARATUS FOR TRANSMITTING FORCE BETWEEN ROTARY DRIVING AND DRIVEN UNITS".

Because the rotating pump and the turbine 5 are axially spaced apart from each other (such spacing can be relatively small or very small), the hydraulic fluid which issues from the gap between these parts is being acted upon by centrifugal force and forms a stream or flow 7 which enters the space between the internal surface 4 of the housing H and the external surface 3 of the shell or casing of the turbine 5. A first channel (between the turbine and the non-illustrated pump) serves to continuously supply hydraulic fluid to the spaces between the pump, the turbine 5 and the stator 6. A second channel 19 between the shafts 49 and 50 serves to return hydraulic fluid (hereinafter called oil for short) to a pump (not shown) which recirculates oil to the first channel and preferably causes the oil returning via channel 19 to flow through one or more suitable cleaning, cooling and/or other or analogous processing units of any known design.

The housing H of the improved torque converter 1 further accommodates a bypass clutch or lockup clutch 2 which is located in the path of the flow of the oil stream 7, which can be driven by the prime mover of the power train by way of the connector 15 and which, when engaged, can transmit torque to the turbine 5 by way of the damper 30. The illustrated bypass clutch 2 comprises a radially outer lamination carrier 13 which is bonded or otherwise non-rotatably affixed to the housing H by one or more welded seams 33 or in another suitable way, a radially inner lamination carrier 14 which is secured to the left-hand inlet or input element 36 of the damper 30 by rivets 31 (only one shown in FIG. 1), and a package or stack 10 of annular disc-shaped lamellae or laminations 10a, 10b (see also FIGS. 5a, 5b and 6) between the carriers 15, 16.

The package 10 includes first or outer laminations 10a having radially outermost portions which are compelled to rotate with the carrier 13, and second or inner laminations 10b having radially innermost portions which are compelled to rotate with the carrier 14 and alternate with the laminations 10a. The bypass clutch 2 is fully engaged when the laminations 10b are compelled to rotate with the laminations 10a without any slip. The means for pressing the alternating laminations 10a, 10b against each other (as seen in the direction of the axis 16) comprises the aforementioned annular biasing member 11 which is movable in the direction of the axis 16 and has a suitable annular protuberance 11a adjacent the left-hand outer lamination 10a (as viewed in FIG. 1). Those surfaces of the alternating laminations 10a, 10b which are adjacent each other are or can be provided with suitable friction linings which promote frictional engagement between neighboring laminations in a manner well known from the art of clutches and analogous friction generating devices. The distribution of friction linings is preferably such that uncoated surfaces of the laminations 10a cannot come into contact with the uncoated surfaces of the laminations 10b.

The radially outer lamination carrier 13 is provided with an annular washer-like pressure plate 27 which is adjacent the axially innermost lamination 10b and is held by a ring-shaped safety device 28. The pressure plate 27 opposes axial movements of the adjacent lamination 10b when the biasing member 11 is caused to move in a direction to the right, as viewed in FIG. 1, i.e., to reduce the thickness of the package 10 and to thus increase friction between the linings of neighboring laminations 10a, 10b. The biasing member 11 is urged in a direction to the right by oil in a third channel 18 which is disposed between the member 11 and the adjacent portion of internal surface 4 of the housing H. The radially innermost portion of the biasing member 11 is slidable axially of the torque converter 1 along the external surface of the aforementioned guide member 24 which surrounds the adjacent portion of the shaft 49. Annular sealing elements (e.g., rings) 17 are interposed between the outer carrier 13 and the biasing member 11 as well as between the biasing member 11 and the guide member 24. The biasing member 11 has an internal gear 23 which mates with but is movable axially of a complementary external gear on the guide member 24. The latter is mounted in such a way that it cannot rotate and/or move axially relative to the housing H.

When the biasing member 11 is caused to move against and with the adjacent lamination 10a, the laminations 10a, 10b are pressed against each other and the rightmost lamination 10b of FIG. 1 bears upon the pressure plate 27. The latter abuts the fixedly mounted safety ring 28. This takes place when the pressure of oil in the stream 8 being supplied through the axial bore or passage of the shaft 49 exceeds the pressure of oil in the stream 7; the oil in the stream 7 acts upon the laminations 10a, 10b of the package 10 and urges them axialy toward the biasing member 11, i.e., to the left as viewed in FIG. 1.

Each of the lamination carriers 13, 14 is provided with at least one radial opening or window (not shown in FIG. 1). As a rule, each of these carriers is provided with an annular array of openings or windows which serve to admit streamlets 9 of oil from the stream 7 and along the friction linings on the laminations 10a, 10b. The direction of flow of such streamlets 9 depends upon the direction of flow of oil in the stream 7. If the stream 7 flows from the non-illustrated source (e.g., a pump) to the turbine 5 and into the channel between the surfaces 3 and 4, the streamlets 9 flow through the bypass clutch 2 and substantially radially inwardly, i.e., from the windows of the carrier 13 toward and through the windows of the carrier 14. In addition to such radial streamlets 9, the torque converter 1 of FIG. 1 further provides one or more paths 29 for the flow of oil in at least substantial parallelism with the axis 16, i.e., from the safety ring 28 toward that annular sealing element 17 which is adjacent the welded seam 33 and operates between the outer lamination carrier 13 and the radially outermost portion of the biasing member 11. Such oil streams merge into the streamlets 9 at the radially inner side of the lamination carrier 14 and are discharged from the housing H by way of the channel 19 between the shafts 49 and 50. The paths 29 are provided radially inwardly of the outer lamination carrier 13.

The purpose of the turbine damper 30 is to minimize vibrations which are being transmitted by the prime mover of the power train while the bypass clutch 2 is fully or at least nearly fully engaged. The turbine damper 30 which is shown in FIGS. 1 to 4 comprises the two (left-hand and right-hand) input or inlet elements 36 having radially extending abutting radially outermost portions which are affixed to each other by an annular array of rivets 31 (only one shown). The left-hand input element 36 is further secured to a radially extending disc-shaped portion or element 51 of the inner lamination carrier 14 of the bypass clutch 2 by another set of rivets including the aforementioned rivet 31. The input elements 36 are provided with registering windows 39 which are flanked by substantially ring-shaped portions 45 of the respective input elements 36 and receive pairs of interfitted circumferentially extending coil springs 40, 41 or analogous resilient elements. The end faces at one end of each pair of interfitted coil springs 40, 41 bear upon the adjacent radially extending surfaces in the respective windows 39 of the input elements 36, and the end faces at the other end of each pair of interfitted springs 40, 41 bear upon the radially outermost portions of prongs provided on the output element 36a of the damper 30. The output element 36a is coupled to the hub-shaped support 35 which surrounds the flange 34 on the input shaft 49. The torque-transmitting connection between the turbine damper 30 and the shaft 49 comprises the aforementioned mating internal and external gears 46, one on the flange 34 and the other on the output element 36a.

Since the flange 34 can constitute a simple staming in contrast to the more complex and more expensive mating gears 46, it is advisable to produce the flange independently of such gears and to connect the flange to the gears in a next-following step. Such connection can include one or more welded seams 33. Furthermore, and in order to limit the extent of angular movement of the flange 34 and the input elements 36 of the turbine damper 30 relative to each other, there is provided at least one stop 42 which is borne by the right-hand input element 36 and has limited freedom of angular movement relative to the adjacent radially outwardly projecting portion of the output element 36a. As already mentioned hereinbefore, the output element 36a is rotatable with the flange 34 on the input shaft 49.

When the bypass clutch 2 is not engaged, the flow of power takes place from the output member (such as the crankshaft or camshaft or the flywheel) of the prime mover, e.g., an internal combustion engine of the power train, through the connector means 15 and housing H of the torque converter 1, and to the non-illustrated pump in or on the housing H. Owing to the hydrodynamics of the torque converter 1, the pump drives the turbine 5 but the clearance between the pump and the turbine effects a first damping of torsional vibrations. Furthermore, and since the turbine 5 has an internal gear which mates with the external gear on the hub-shaped support 35 which, in turn, connects the turbine with the right-hand input element 36 of the turbine damper 30, the flow of power (and hence the torque with the oscillations superimposed thereon) is transmitted to the damper 30. The latter acts as a spring-mass system and brings about an additional torsional vibration damping action. The turbine damper 30 transmits torque to the turbine shaft 49, i.e., to the input shaft of the transmission if the structure of FIG. 1 is embodied in the power train of a motor vehicle.

When the bypass clutch 2 is engaged, the flow of power takes place from the torque converter housing H, through the bypass clutch and on to the left-hand input element 36 of the turbine damper 30. At such time, no torque is being transmitted by way of the right-hand input element 36 of the turbine damper 30 because, when the bypass clutch is engaged, the RPM of the non-illustrated pump in or on the housing H matches that of the turbine 5. The power flow from the left-hand input element 36 of the turbine damper 30 to the input shaft 49 is the same when the latter is driven by the housing H through the medium of the pump, turbine 5 and the right-hand input element 36 of the damper 30.

In the torque converter 1 of FIG. 1, the turbine 5 is not directly connected with the flange 34 of the turbine damper 30. Therefore, the turbine 5 can be said to be carried by the hub-shaped support 35. In order to properly locate the latter in the axial direction of the torque converter 1, there is provided a ring-shaped axial stop 25 which operates between the flange 34 and the support 35. The flange 34 is provided with a passage 48a for the flow of oil back into the second channel 19; this passage communicates with a second passage 48b which is provided in the support 35 and leads to the channel 19. The second passage 48b is indicated by broken lines because it is not located in the plane of FIG. 1. This Figure shows that the ring-shaped axial stop 25 offers negligible resistance to the flow of oil from the passage 48b into the second channel 19.

The torque converter 1 of FIG. 1 exhibits a number of important novel features and advantages. One of these features includes the provision of a diaphragm or membrane 26 which prevents the flow of oil along the radially inner portions of laminations 10a, 10b forming the package 10. The term "diaphragm" or "membrane" to denote the part 26 is selected because this part is a thin elastic disc the radially outermost portion of which is artificially or naturally tensioned in such a way that it invariably overlies and bears against the parts 14, 28 at the inner side of the bypass clutch 2. This prevents or greatly reduces the likelihood of a "short-circuiting", i.e., a flow of oil past the bypass clutch 2. When it flows through the clutch 2, oil must flow from the outer side of the outer lamination carrier 13 and between the laminations 10a, 10b of the package 10 which is borne by the carriers 13 and 14. The safety ring 28 is partially recessed into the internal surface of the outer lamination carrier 13; this ring and/or the carrier 13 defines several paths for the flow of oil into the interior of the bypass clutch 2.

In order to further reduce the likelihood of uncontrolled flow of oil, the torque converter 1 is provided with additional short-circuit preventing or flow blocking means. To this end, the radially inner portion of the annular space between the internal surface 4 of the housing H and the external surface 3 of the shell of the turbine 5 accommodates a plurality of disc-shaped elements 51 which are installed in the path for the flow of oil in such a way that oil can flow only between these disc-shaped elements. Moreover, the connection between the left-hand input element 36 of the turbine damper 30 and the right-hand marginal portion of the inner lamination carrier 14 is a connection that can be employed between two plate-like or disc-shaped parts so that the diaphragm 26 can be said to constitute a safety device which is desirable but not absolutely necessary, as far as the controlled flow of oil into and from the interior of the bypass clutch 2 is concerned. The radially inner part of the left-hand input element 36 of the damper 30 is a plate (i.e., one of the aforementioned disc-shaped elements 51), and this radially innermost part cooperates with the adjacent radially extending inner portion (51) of the inner lamination carrier 14 to permit for a simplification of the construction, configuration and mounting as well as of the oil flow regulating action of the diaphragm 26.

The clearances between the left-hand input element 36 of the turbine damper 30 and the flange 34, as well as between the flange 34 and the hub-shaped turbine support 35 could also provide paths wherein oil could escape without appreciable resistance. These clearances accommodate diaphragm springs 37 which are installed in sufficiently stressed condition to bear against one and react against the other of the respective parts with the result that the streams of oil cannot flow around and thus bypass the springs 37. If these diaphragm springs 37 are dimensioned in such a way that they bear and react against the neighboring pairs of parts (such as 26, 36 and 34, 35) with a requisite force, this not only reduces the likelihood of leakage but aso enables the springs 37 to act as torsional vibration damping means, i.e., in addition to the damper 30.

Figure 2:
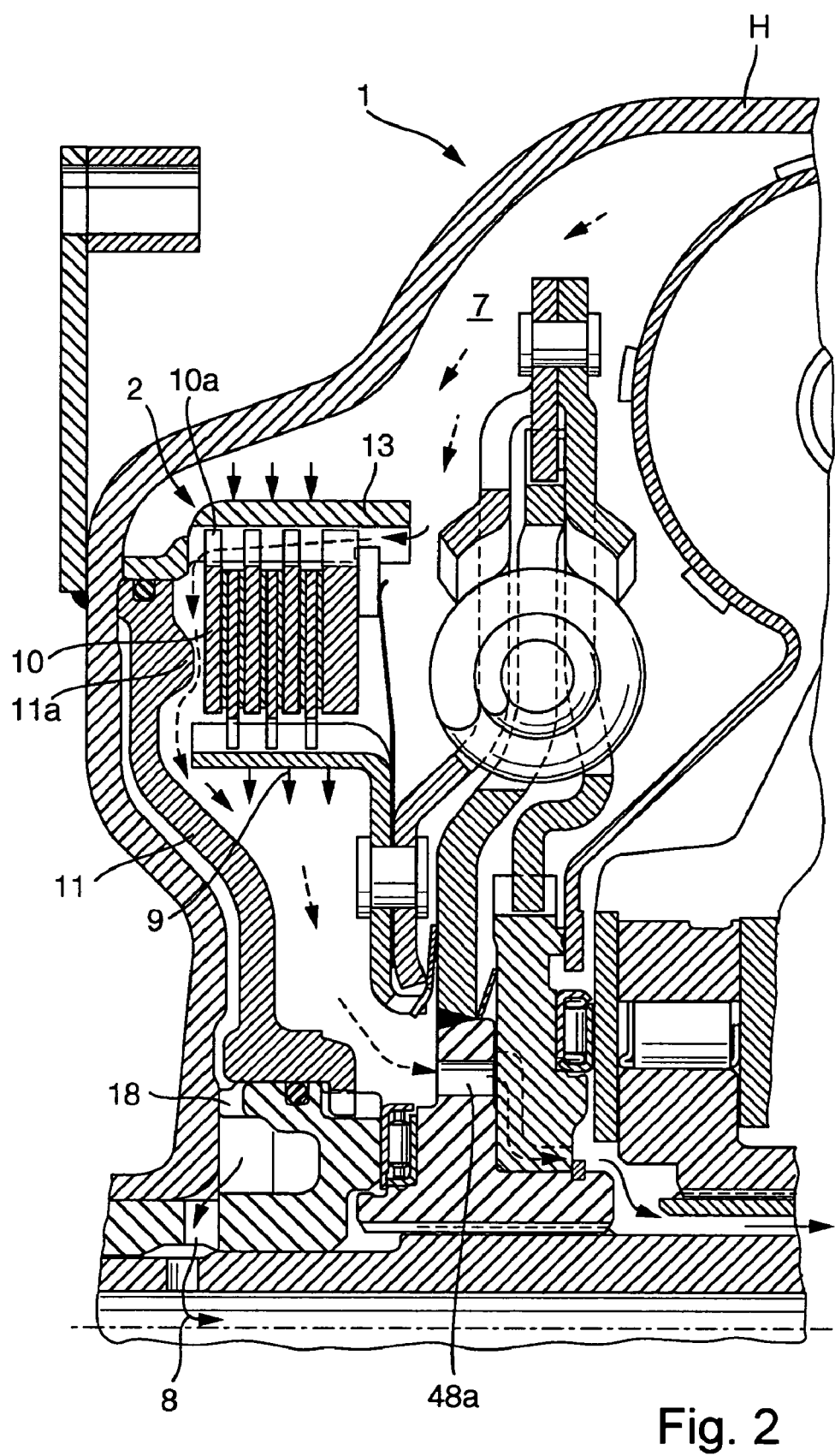
FIG. 2 illustrates the structure of FIG. 1 but with the bypass clutch shown in the disengaged condition.

In contrast to FIG. 1, FIG. 2 shows the bypass clutch 2 of the torque converter 1 in the open (i.e., disengaged) condition. Thus, the pressure of the oil stream or flow 8 which is shown in FIG. 2 is below the pressure of this oil stream in FIG. 1. The right-hand side of the biasing member 11 is being acted upon by the partial oil stream 9 and, if the pressure of oil in the stream 9 exceeds that of oil in the discrete stream 8, the biasing member 9 moves in a direction to the left and its annular protuberance defines with the adjacent outer lamination 10a an annular clearance or gap for the flow of oil from the interior of the bypass clutch 2 into the radially inwardly located space communicating with the passage 48a. Thus, when the bypass clutch 2 is disengaged, oil need not flow from the adjacent laminations 10a, 10b of the package 10 but can flow along the protuberance 11a and radially inwardly toward the passage 48a. This does not affect the operation of the bypass clutch 2 because, when the clutch is disengaged, the laminations 10a, 10b need not be cooled and/or cleaned and/or lubricated. The ability of oil to flow along the protuberance 11a contributes to savings in energy.

One feature of the method of the present invention resides in that the flow of oil between the surfaces 3, 4 in the housing H (but outside of the non-illustrated pump, the turbine 5 and the stator 6) is regulated in a manner such that the oil flow 7 is being interfered with (i.e., opposed) in such a way that the rate of oil flow though the bypass clutch is increased, i.e., thst the laminations 10a, 10b of the package 10 are subjected to a more pronounced lubricating action. A second undertaking (which is at last substantially equivalent to the just outlined undertaking) includes reducing the resistance to the flow of oil through the bypass clutch 2 to thus increase the rate of fluid flow along the friction surfaces of the laminations 10a, 10b.

The flow or stream which is conveyed through the bypass clutch 2 (see the streamlets 7 in FIG. 1) is only a fraction of the overall oil stream flowing in the housing H. The undertaking of engaging and disengaging the bypass clutch by subjecting the latter to the action of a hydrostatic oil stream can be effected, at least in most instances, by the entire oil stream. This necessitates a special design of the bypass clutch; it depends only upon the kinematic design of the bypass clutch and the torque converter.

In most instances, the oil stream which enters the torque converter flows initially into the pump and leaves the latter through the clearance between the pump and the turbine to form the flow or stream 7 between the internal surface 4 of the housing H and the external surface 3 of the shell or casing of the turbine 5. However, it is equally within the purview of the instant invention to cause oil to flow between the surfaces 3, 4 and to thereupon enter the pump or the turbine of the improved torque converter If, in accordance with one of the novel undertakings, the flow of oil in selected parts of the torque converter is being interfered with, this entails an overall increase of oil pressure in the housing H. Therefore, and if the interference with the oil flow is uninterrupted (constant), at least while the bypass clutch 2 is disengaged, it is desirable and advantageous to ensure that a portion of the oil flow be conveyed between the annular biasing member 11 and the adjacent outermost lamination 10a or its friction lining. This entails a more or less unimpeded circulation of oil which, in turn, results in a reduction of oil pressure and in savings in power.

In accordance with a desirable advantageous feature of the present invention, the pressure of the separate or discrete oil stream (namely the stream which can engage (close) the bypass clutch 2) is regulated in a manner such that its pressure is increased to a first value and is thereupon reduced to a second value as well as that the pressure is altered as a function of time in accordance with a characteristic curve.

In order to regulate the pressure of the oil stream, one can resort to a sensor which is installed in the discrete hydrostatic oil stream and can be set up, for example, to monitor the actual oil pressure. In dependency upon the actually measured oil pressure at a predetermined location, it is then possible to effectively trim to a predetermined desired clutching behavior. However, it is also possible to utilize a temperature sensor, for example, to ensure that the body of oil has not been heated beyond a predetermined permissible temperature. Still further, the regulation can involve ensuring that the temperature of oil will be maintained at a high or very high but still permissible value so that a relatively small oil stream can withdraw a maximum amount of heat.

If an oil stream is caused to flow through the bypass clutch, there develops between the inlet and outlet points a pressure differential which is a function of the overall oil stream and the resistance which the bypass clutch offers to oil flow, i.e., in a direction as seen radially of the axis 16 of the torque converter 1. Such differential is preferably in the range of between about 0.1 and 3 bar, and more preferably between about 0.2 and 1 bar. At the same time, the rate of oil flow through the bypass clutch 2 is preferably between about 0.2 and 1 liter per minute. The greater the rate of oil flow through the clutch 2, the more satisfactory is the removal of heat in the region of the laminations 10a, 10b forming the package 10 in the space between the carriers 13, 14 of the bypass clutch 2. Of course, by increasing the rate of oil flow through the bypass clutch 2, one also increases the consumption of driving power.

In accordance with a presently preferred specific feature of the improved method, the bypass clutch 2 is intentionally operated in partially engaged condition. This entails the establishment of a relative movement between the friction linings and the adjacent component parts of the clutch, i.e., the latter is then operated with slip.

If the discrete or separate hydrostatic oil stream is conveyed in a pulsating fashion, the bypass clutch 2 is repeatedly opened (disengaged) and closed (engaged) in pulsating fashion. This leads to the development of phases or stages of ready opening of the clutch 2, i.e., the torque converter is caused to establish and maintain a pulsating flow of oil along the friction linings of the laminations 10a and 10b which together constitute the package 10. Such mode of operation renders it possible to intentionally (controlledly) influence the transmission of torque by the bypass clutch, for example, to provide a sinusoidal timely progress of torque transmission. Otherwise stated, it is possible to intentionally establish in the power train of a motor vehicle torsional vibrations, namely torsional vibrations which are superimposed upon the overall vibration system of the power train in the motor vehicle. For example, a purposeful or aimed regulation or controlling of such intentionally generated vibrations renders it possible to minimize torsional vibrations in the power train of the motor vehicle.

The novel increase of the rate of oil flow through the illustrated and described bypass clutch 2 or an equivalent thereof (be it a constant flow or a pulsating flow) exhibits the additional advantage that the bypass clutch is subjected to a more pronounced cooling action. The quantity of heat which is taken up by the oil is removed in one or more cooling units of any known design, e.g., of the type customary in the power trains of motor vehicles embodying automatic transmissions. Reference may be had, for example, to "Modern Automotive Technology" by James E. Duffy (1994 edition, published by The Goodheart-Willcox Company, Inc.) and to other publications by the same author. All patents, patent applications and other publications identified in the specification of the present application are incorporated herein by reference. Coolers which can be utilized in the power trains embodying torque converters of the category to which the present invention pertains are known as oil coolers; they normally constitute relatively small heat exchangers and can resemble those used for cooling engine oil and/or automatic transmission fluid. Torque converters somewhat similar to the aforedescribed torque converter 1 are disclosed in commonly owned copending U.S. patent application Ser. No. 10/704,264 filed Nov. 6, 2003 by Stephan Maienschein for "TORQUE CONVERTER".

Automatic transmissions which can form part of power trains utilizing the improved torque converter are or can be those which can effect the transmission of torque without an interruption of tractive force or pulling force and can embody at least one suitable planetary gearing. However, the power train which embodies the improved torque converter can also employ a continuously variable transmission (CVT), e.g., a CVT transmission of the type disclosed in commonly owned U.S. Pat. No. 5,725,447 granted Mar. 10, 1998 to Friedmann et al. for "POWER TRAIN WITH INFINITELY VARIABLE RATIO TRANSMISSION". The improved torque converter can be installed between the rotary output member of the prime mover (such as an internal combustion engine) and the shaft for the first adjustable pulley of such CVT transmission.

As already mentioned hereinbefore, the method of the present invention can be carried out in a number of ways. One of these ways involves an undertaking comprising a flow of hydraulic fluid into the housing H of the torque converter and interfering with the flow between the turbine and the inner side of the housing to thus increase the rate of fluid flow along one or more laminations of the bypass clutch. The means for interfering with (i.e., opposing) the flow includes the bypass clutch plus at least one additional flow opposing or resisting component. Thus, one of the opponents to the flow of fluid is the bypass clutch itself. The other opponent to the flow interferes with the flow of fluid toward, through and beyond the bypass clutch, i.e., it offers a resistance other than that offered by the bypass clutch alone. Thus, the rate of fluid flow through the bypass clutch is increased.

Figure 5A:
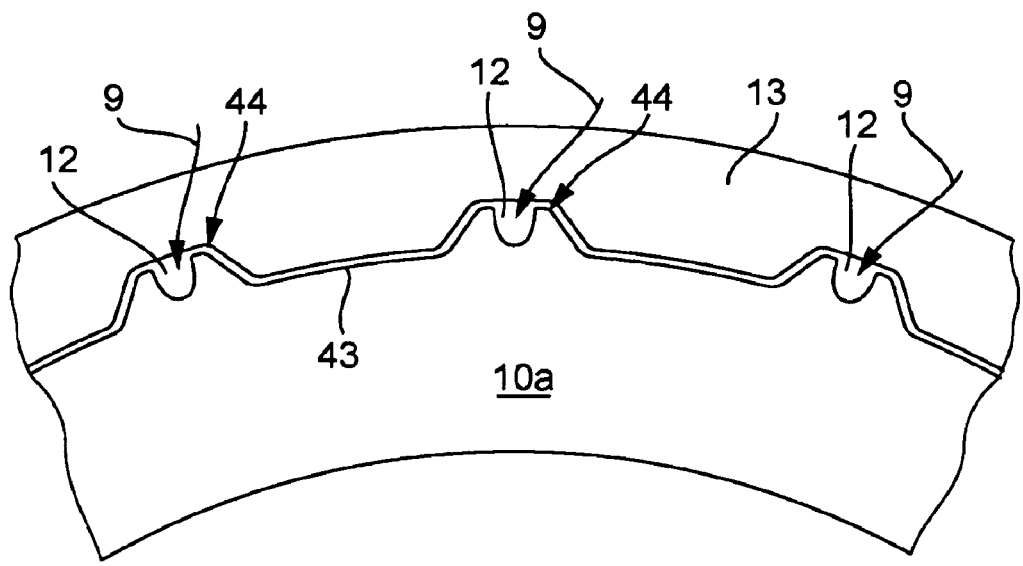
FIG. 5a is an enlarged fragmentary view of a detail in the bypass clutch of a torque converter embodying the present invention.
Figure 5B:
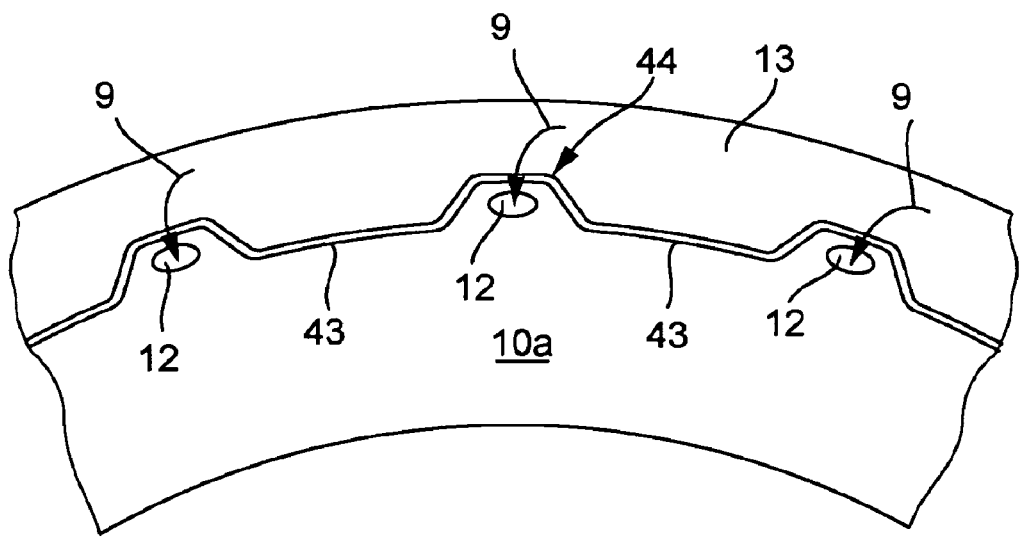

The other undertaking (which can be resorted to jointly with the aforedescribed first undertaking) involves the provision of at least one lamination (such as 10a or 10b) of the stack or package (10) of laminations in the bypass clutch with at least one opening (such as a window) which facilitates or promotes the flow of fluid through the bypass clutch. Openings or passages serving such purpose are shown in FIGS. 5a, 5b (as at 12) and in FIG. 6 (as at 112). The provision of such openings or passages at the radially innermost and/or outermost marginal portions of the laminations contributes to simplicity and lower cost of the solutions. Thus, the teeth at the inner and/or outer circumferences of the laminations rotating with the inner and/or outer lamination carrier cooperate with complementary teeth or tooth spaces of the adjacent parts (such as the inner and/or outer lamination carrier 14 and/or 13) to provide adequate paths for easier flow of fluid through the bypass clutch. The dimensions of internally and/or externally toothed parts of the components 10a, 10b, 13 and/or 14 of the bypass clutch can be readily selected in such a way that the rate of fluid flow through the bypass clutch is impeded to a desired (optimum) extent.

The two undertakings can be utilized independently of or jointly with each other. Thus, one can resort to a torque converter which is designed to ensure a more pronounced flow of fluid through the bypass clutch by resorting to one or more additional fluid flow opposing components as well as or by resorting to one or more additional passages or channels.

When the bypass clutch 2 of the improved torque converter 1 is engaged, the flow of power takes place from the rotating housing H, by way of the bypass clutch and into the input elements 36 of the turbine damper 30. The coil springs 40, 41 (or equivalent or analogous resilient elements) of the damper 30 transmit power from the input elements 36 to the output element 36a which, in turn, transmits power to the input shaft 49 of the transmission by way of the flange 34. The turbine damper 30 contributes to the comfort of the power train which employs the torque converter 1 because it weakens the torsional vibrations by the prime mover. Such comfort is further enhanced by controlled regulation of the slippage in the bypass clutch 2 in conjunction with a larger oil flow through the housing H.

Figure 3:
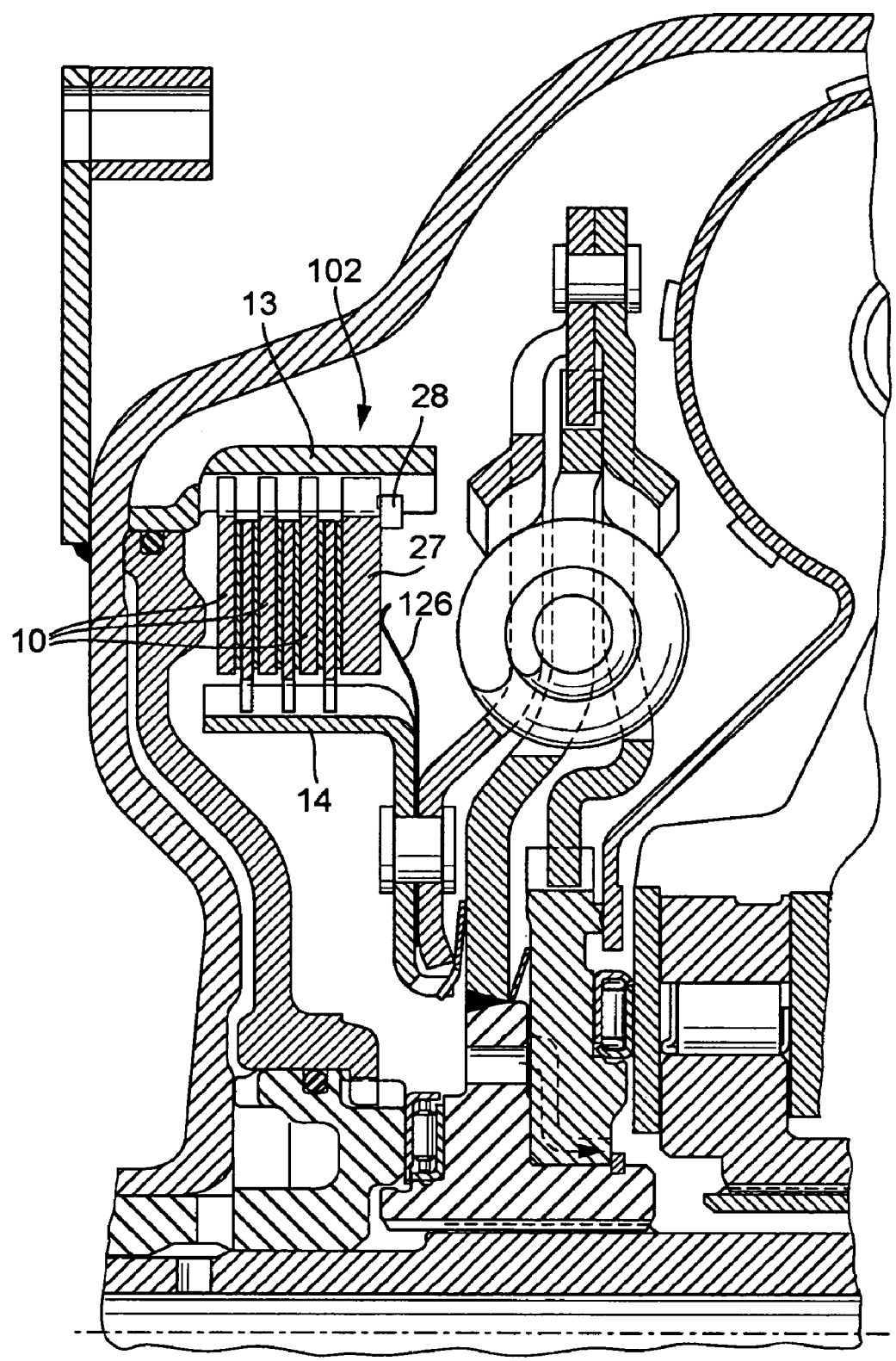
FIG. 3 is a fragmentary axial sectional view of a hydrokinetic torque converter which constitutes a first modification of the torque converter shown in FIGS. 1 and 2.

FIG. 3 illustrates a portion of a torque converter wherein the diaphragm 126 departs from the similarly referenced diaphragm 26 shown in FIGS. 1 and 2. Thus, the outer diameter of the diaphragm 126 is smaller so that its radially outermost portion bears upon the pressure plate 27 radially inwardly of the safety ring 28. When the bypass clutch 102 of FIG. 3 is engaged (FIG. 3 shows this clutch in the disengaged condition), the force of hydraulic fluid acting upon the relatively small diaphragm 126 is smaller. This brings about the advantage that it is not necessary to employ a very strong diaphragm, i.e., the latter can stand relatively long periods of use even if it cannot stand highly pronounced mechanical stresses.

The lamination carriers 13, 14 of the bypass clutch 2 or 102 can turn relative to each other when the clutch is disengaged. Since the pressure plate 27 is anchored in the outer lamination carrier 13, whereas the diaphragm 26 or 126 rotates with the inner lamination carrier 14, the diaphragm 126 of FIG. 3 slides along the right-hand side of the pressure plate 27. Depending upon the then existing oil pressure differential (even if it is much smaller when the clutch 102 is disengaged) and due to the smaller diameter of the diaphragm 126, the pressure upon the plate 27 (and hence the grinding or frictional grinding effect) is then much smaller.

Figure 4:
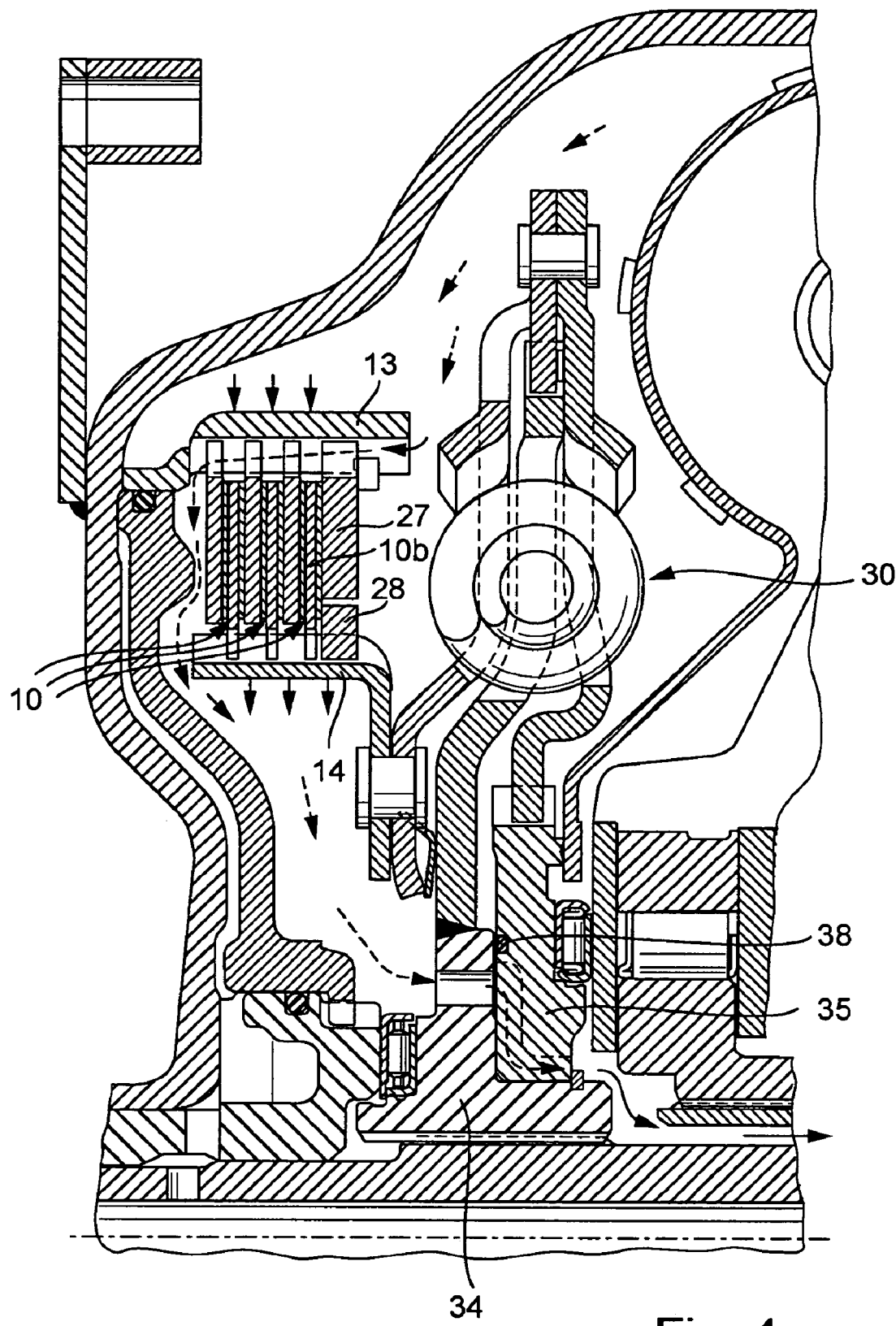
FIG. 4 is a fragmentary axial sectional view of a hydrokinetic torque converter constituting a second modification of the torque converter which is shown in FIGS. 1 and 2.

FIG. 4 shows a portion of a torque converter with different resistance elements. Thus, instead of relying upon the diaphragm 126 of FIG. 3 or upon the diaphragm 26 of FIGS. 1 and 2, the region between the radially inner lamination carrier 14, within the pressure plate 27 and within the rightmost lamination 10b of the package 10 is at least substantially sealed by the ring 28. In order to enable this ring to perform a satisfactory sealing action the configuration of its radially innermost portion closely conforms to that of the adjacent portion of the radially inner lamination carrier 14. In lieu of such sealing action, it is also possible to provide the inner lamination carrier 14 with a circumferentially complete internal groove for the radially innermost portion of the sealing ring 28. Still further, at least that portion of the ring 28 which is adjacent the lamination carrier 14 can consist of or can contain an at least partly elastic material which, when subjected to oil pressure, sealingly engages the inner lamination carrier 14. It is also possible to resort to two or more aforediscussed and/or other sealing features.

The clearance or gap between the hub-shaped support 35 of the turbine damper 30 of FIG. 4 and the flange 34 is narrower than in the embodiments of FIGS. 1–2 and FIG. 3. This establishes a resistance element which is superior to conventional resistance elements. In addition, this clearance or gap receives a sealing ring 38 which is recessed into the adjacent radial surface of the support 35. Such arrangement renders it possible to dispense with the right-hand diaphragm spring 37 of FIGS. 1 to 3. The sealing ring 38 of FIG. 4 can constitute an O-ring, a ring having a polygonal (such as square) cross-sectional outline, a ring made of felt or an equivalent, analogous or similar ring.

FIGS. 5a and 5b illustrate a portion of a presently preferred bypass clutch, and more specifically one of the outer laminations 10a and the outer lamination carrier 13. The latter has a circumferentially extending trapeziform inner profile which is at least substantially complementary to the circumferential external profile of the illustrated lamination 10a. This results in the formation of trapeziform recesses or tooth spaces 43 which alternate with shorter trapeziform teeth 44. The configurations of the inner laminations 10b and of adjacent portions of the inner lamination carrier 14 can be similar to or identical with those of the parts 110a and 13 shown in FIGS. 5a and 5b.

In order to enhance the flow of oil streams 9 and to reduce the resistance to such flow between the internal surface of the outer lamination carrier 13 and the laminations 10a, 10b of the package 10, the structure which is shown in FIGS. 5a and 5b is provided with channel-shaped axial passages 12 which are machined into or are otherwise formed in the outer laminations 10a. In FIG. 5a, the passages 12 are recesses, and in FIG. 5b the passages 12 are holes. Since the inner laminations do not extend radially outwardly all the way to the teeth 44, the flow of the oil stream 9 is opposed only or practically exclusively by the teeth 44 of the outer laminations 10a. However, and since the laminations 10a are provided with one or more axial channels or passages 12, the oil stream 9 can readily flow first in the axial direction and thereupon radially from the outside to the inside along the friction linings of the laminations 10a, 10b constituting the package 10.

Figure 6:
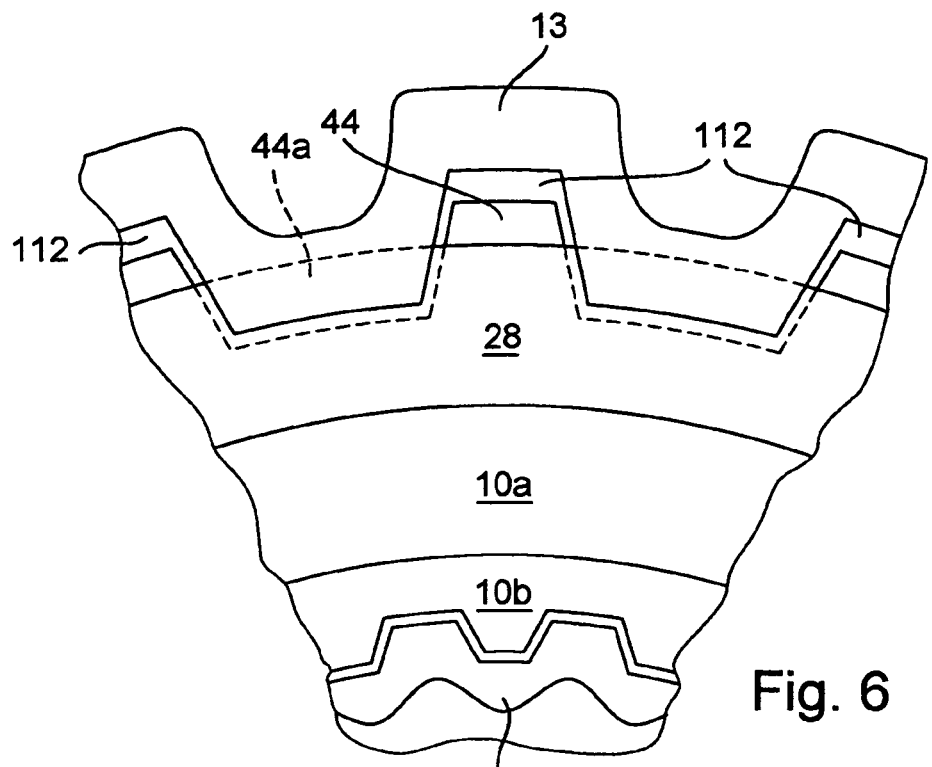
FIG. 6 is an enlarged fragmentary view of a detail in a modified bypass clutch.

Referring to FIG. 6, the radially outer lamination carrier 13 is provided with different relatively narrow elongated passages or channels 112 which extend circumferentially of this carrier. The distance between the outer lamination carrier 13 and the outer lamination 10a shown in FIG. 6 is exaggerated for the sake of clarity. The part 28 is a safety ring or securing ring and is provided with radially outwardly extending trapeziform teeth which extend into the internal tooth spaces of the carrier 13. The unoccupied radially outermost portions of such tooth spaces constitute the passages or channels 112. The outer diameter of the safety ring 28 is selected in such a way that it does not fully overlie the teeth 44 of the adjacent outer lamination 10a.

As can be readily seen in FIG. 6, the passages or channels 112 develop because the radially outermost portions of the teeth 44 do not extend all the way to the radially outermost (deepmost) portions of tooth spaces which are provided in the internal surface of the outer lamination carrier 13 between its radially inwardly extending teeth 44a. This Figure further shows that the inner lamination 10b is in highly satisfactory sealing engagement with the inner lamination carrier 14. Such arrangement reliably prevents (what can be called) a short circuiting of the oil flow.

Figure 7:
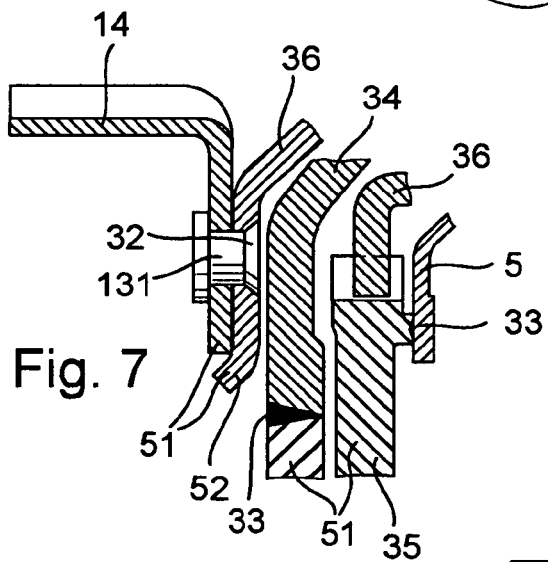
FIG. 7 is a fragmentary sectional view of a detail in a further hydrokinetic torque converter.

FIG. 7 shows a detail of a further torque converter which can be of the type shown in FIGS. 1 to 4. A first difference between the embodiments of FIGS. 1–4 and 7 is that the radially inner lamination carrier 14 of the bypass clutch including the carrier 14 of FIG. 7 is riveted (at 131) to the left-hand input element 36 of the turbine damper in a manner such that the right-hand rivet head 32 is recessed into the left-hand input element 36. Thus, the head 32 does not or does not appreciably extend beyond the right-hand side of the left-hand input element 36. Such mounting of the rivet 131 can be achieved by utilizing a rivet 131 having a properly finished (prefabricated) head 32 or by subjecting the head of a standard rivet (such as the one shown in FIG. 1) to a material removing treatment subsequent to connection of the parts 14 and 36 to each other. The secondary treatment can include grinding, turning and/or another operation.

An advantage of a torque converter wherein the inner carrier 14 of the bypass clutch is secured to the adjacent input element 36 of the turbine damper in a manner as shown in FIG. 7 is that the gap between the parts 34, 36 is very narrow and offers a desirable resistance to the flow of oil therethrough.

If the rivet head 32 is located beneath (radially inwardly of) the right-hand surface of the left-hand input element 36 of FIG. 7, such right-hand surface can also be placed close or very close to the flange 34 so that the parts 36, 34 can offer the aforediscussed desirable resistance to the flow of oil between them.

Another important difference between the torque converter 1 of FIGS. 1 to 4 and the torque converter embodying the structure of FIG. 7 is that the annular radially innermost portion 52 of the left-hand input element 36 shown in FIG. 7 is bent in a direction to the left, i.e., away from the adjacent at least substantially radially extending portion of the flange 34. This also permits for the placing of the left-hand input element 36 into close or immediate proximity to the flange 34. The orientation (extent of inclination) of the innermost portion 52 can be determined by resorting to a predetermined sequence of operations in conjunction with selected directions of treatment (such as stamping). As can be seen in FIG. 7, the disc-shaped elements 51 (parts of the members 14, 36, 34 35) can be located in close proximity to each other.

FIG. 7 further shows that the flange 34 and the hub-shaped support 35 define a narrow clearance or gap in the region of the V-shaped welded seam 33. Since the surface of the flange 34 which faces the support 35 preferably undergoes a secondary treatment, it is possible to place the parts 34, 35 into very close or immediate proximity to each other. The right-hand welded seam 33 of FIG. 7 connects the right-hand input element 36 of the turbine damper to the adjacent portion of the shell of the turbine 5.

Figure 8:
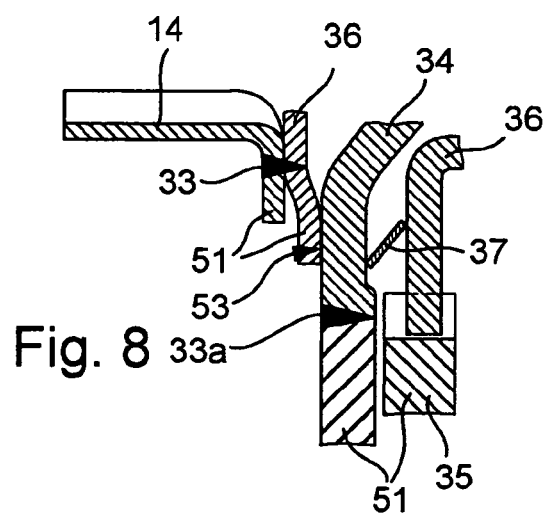
FIG. 8 is a similar fragmentary sectional view of a detail in a hydrokinetic torque converter constituting a modification of that which is shown in FIG. 7.

FIG. 8 shows a modification of the structure which is illustrated in FIG. 7. The inner lamination carrier 14 of the bypass clutch is secured to the left-hand input element 36 of the turbine damper by a welded seam 33, and the radially innermost portion of this left-hand input element is bent in a direction to the right, i.e., into immediate proximity of the flange 34, to establish therewith a friction zone 53. The seam 33 between the parts 14 and 36 can be obtained by resorting to a laser welding machine. In order to enhance the power flow as well as to homogenize the material tension concentration, the radially innermost portion of the flange 34 (one of the disc-shaped elements 51) is enlarged by the addition of a separate element 51 which is welded (at 33a) to the flange 34.

The friction zone 53 exhibits (in comparison with the circular friction zones, such as those at the radially inner and outer marginal portions of the diaphragm sprig 37 shown in FIG. 7 and the adjacent parts 34, 36) the advantage that the friction between two surfaces which lie flush against each other is much less than between the parts 34, 36 and the edges of the diaphragm spring 37. In addition, the friction surfaces at the friction zone 53 of FIG. 8 constitute a desirable resistance element between two of the disc-shaped elements 51.

An advantage of the closely adjacent disc-shaped elements 51, which oppose the flow of oil along the second path (such as that including the passages 48a, 48b and the channel 19 shown in FIG. 1), is that they also contribute to the comfort of the occupant(s) of the motor vehicle having a power train which embodies the improved torque converter. In FIG. 1, one of the disc-shaped elements 51 is of one piece with the inner lamination carrier 14. Another disc-shaped element 51 is constituted by the annular radially inner portion of the left-hand input element 36 of the turbine damper 30, and a third disc-shaped element 51 is constituted by the radially innermost portion of the output element 36a of the damper 30. A further disc-shaped element 51 is constituted by the radially innermost portion of the right-hand input element 36, and an additional disc-shaped element constitutes the radially innermost portion of the shell 5a of the turbine 5.

In many conventional torque converters, the parts which could be said to perform the functions of the just enumerated disc-shaped elements 51 are spaced apart from each other, as seen in the axial direction of the torque converter, by distances such that they cannot appreciably influence the radial flow of hydraulic fluid along at least one second path.

As can be seen in FIG. 7, the right-hand head 32 of the rivet 131 between the disc-shaped elements 51 of the inner lamination carrier 14 and the left-hand input element 36 is recessed into the respective disc-shaped element 51 in such a way that it offers little or no resistance to the flow of fluid between the left-hand input element 36 and the flange 34. The resistance is offered, mainly or exclusively, by the selected width of the clearance between such disc-shaped elements.

On the other hand, if the disc-shaped elements 51 are welded to each other (refer to the two left-hand disc-shaped elements 51 shown in FIG. 8), the welded seam 33 (which is or which can be a laser welded seam) can be configured in such a way that it does not extend at all, or extends only negligibly, from the surfaces of the welded-together elements. This also ensures that the flow of fluid along the elements 51 is determined exclusively or primarily by the clearances between such elements rather than by the welded seams. Thus, the widths of such clearances can greatly influence the pressure of fluid in the housing H and hence the rate of fluid flow through the bypass clutch 2, i.e., along the surfaces of the laminations 10a, 10b.

If the disc-shaped elements 51 are stampings, their projections (e.g., in the form of burrs and/or bent and/or pushed-out portions) can and should extend away from the neighboring disc-shaped elements. The same applies if the disc-shaped elements 51 are in the form of cuttings.

If the disc-shaped elements 51 are stampings, their production can be simplified if those surfaces thereof which confront the neighboring elements 51 have a secondary finish, such as a treatment in a grinding or turning machine. In other words, the secondary finish can even more reliably ensure that the clearances between neighboring disc-shaped elements are within prescribed limits, i.e., that the elements 51 are best suited to ensure that the rate of fluid flow between the laminations 10a, 10b of the stack or package 10 in the bypass clutch is optimal.

As far as the clearances between neighboring disc-shaped elements are concerned, it is important to ensure that the widths of such clearances (i.e., as seen in the direction of the axis 16 of the torque converter 1 shown in FIG. 1) as well as their lengths (as seen radially of the axis 16) be maintained within predetermined optimum ranges. Thus, the quantity of fluid (such as oil) which is caused to flow along the friction linings of the laminations 10a, 10b in the package 10 of the bypass clutch 2 per unit of time is dependent primarily upon three parameters, namely the pressure of fluid, the width of the clearances between the disc-shaped elements 51 (as measured axially of the torque converter 1 and its bypass clutch 2), and the length of such clearances as measured radially of the torque converter. As already mentioned hereinbefore, it has been ascertained that a highly satisfactory width of such clearances is between about 0.1 and 2 mm (preferably between about 0.5 and 1 mm), and that a highly satisfactory length of the clearances is between about 1 and 30 mm (preferably between about 1 and 10 mm).

The illustrated disc-shaped elements 51 can be replaced by or utilized jointly with other suitable fluid flow opposing means, e.g., such elements can be replaced with one or more sealing rings, diaphragm springs and/or diaphragms, i.e., with separately produced parts which are affixed to certain neighboring parts such as lamination carriers, hubs, input and/or output element(s) of the torque converter, and others.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torque converters for use in the power trains of motor vehicles and, therefore, such adaptations should and are intended to be comprehended within the meaning and range of equivalence of the appended claims.

The invention claimed is:

1. A method of metering the flow of a hydraulic fluid along at least one friction surface of at least one lamination of a package of neighboring laminations in an engageable and disengageable bypass clutch forming part of a hydrokinetic torque converter wherein a housing confines a pump, a stator and a turbine in addition to the bypass clutch, comprising at least one of a plurality of undertakings including: a first undertaking comprising the steps of supplying hydraulic fluid into the housing and interfering with the flow of fluid between the turbine and an inner side of the housing to thus increase the rate of fluid flow along the at least one lamination; and a second undertaking including the step of reducing resistance to the flow of fluid through the bypass clutch to thus increase the rate of fluid flow along the at least one friction surface of the at least one lamination, wherein the first and second undertakings are performed in different locations of the torque converter and the hydraulic fluid flows in a direction from an inner space between the turbine and the inner side of the housing toward the package of laminations.

2. The method of claim 1, further comprising the steps of hydrostatically engaging and disengaging the bypass clutch, including subjecting the bypass clutch to the action of a hydrostatic fluid stream.

3. The method of claim 1, wherein said step of supplying hydraulic fluid includes conveying a stream of hydraulic fluid along a first path extending through the pump, turbine and stator, and thereafter along a second path between an internal surface of the housing and an external surface of the turbine.

4. The method of claim 1, wherein said step of supplying hydraulic fluid includes conveying a stream of hydraulic fluid along a first path extending between an internal surface of the housing an external surface of the turbine and thereafter along a second path extending through the pump, turbine and stator.

5. The method of claim 1, further comprising the step of hydrostatically engaging and disengaging the bypass clutch, said resistance reducing step including establishing a path for the flow of fluid between a biasing member and an adjacent lamination in the disengaged condition of the bypass clutch.

6. The method of claim 1, further comprising the steps of regulating the pressure and the temperature of the fluid.

7. The method of claim 1, wherein said resistance reducing step includes reducing the pressure of hydraulic fluid by between about 0.1 and 3 bar.

8. The method of claim 7, where the pressure of hydraulic fluid is reduced between about 0.2 and 1 bar.

9. The method of claim 1, wherein said fluid supplying step includes conveying the fluid in the housing at a rate of between about 0.1 liter and 10 liters per minute.

10. The method of claim 9, wherein said rate is between about 0.2 and 1 liter per minute.

11. The method of claim 1, further comprising the step of hydrostatically engaging and disengaging the bypass clutch, including conveying through the bypass clutch a discrete fluid stream at a rate and at a pressure such that the clutch is operated with slip.

12. The method of claim 11, wherein the discrete fluid stream is a pulsating stream.

13. The method of claim 11, wherein said operation with slip includes minimizing torsional vibrations in a power train embodying the torque converter.

14. The method of claim 1, wherein at least one of said undertakings includes the step of cooling the bypass clutch.

15. The method of claim 1, wherein at least one of said undertakings includes transmitting torque from a prime mover to an automatic transmission in the power train of a motor vehicle.

16. The method of claim 1, wherein at least one of said undertakings includes transmitting torque from a prime mover to a continuously variable transmission in the power train of a motor vehicle.

17. A method of metering the flow of a hydraulic fluid along at least one friction surface of at least one lamination along of a package of neighboring laminations in an engageable and disengageable bypass clutch forming part of a hydrokinetic torque converter, wherein a housing confines a pump, a stator and a turbine in addition to the bypass clutch, comprising the steps of:

supplying the hydraulic fluid into the housing;

interfering with the flow of the hydraulic fluid between the turbine and an inner side of the housing to thus increase the rate of fluid flow along the at least one lamination; and interfering with the flow of the hydraulic fluid through the bypass clutch and along a radially inner portion of the friction surface of at least one lamination, wherein the at least one lamination includes at least one window to promote flow of the hydraulic fluid through the clutch and a profile of the at least one lamination and an adjacent member is selected so as to impede the flow rate of the hydraulic fluid through the clutch to a desired extent, the hydraulic fluid flowing in a direction from an inner space between the turbine and the inner side of the housing toward the at least one lamination.

* * * * *